(12) United States Patent
Kim et al.

(10) Patent No.: US 8,294,837 B2
(45) Date of Patent: Oct. 23, 2012

(54) SENSOR ARRAY SUBSTRATE, DISPLAY DEVICE INCLUDING THE SAME, AND METHOD OF MANUFACTURING THE SAME

(75) Inventors: Woong-Kwon Kim, Cheonan-si (KR); Dae-Cheol Kim, Hwaseong-si (KR); Dong-Kwon Kim, Asan-si (KR); Ki-Hun Jeong, Cheonan-si (KR); Sung-Hoon Yang, Seoul (KR); Sang-Youn Han, Seoul (KR); Suk-Won Jung, Goyang-si (KR); Byeong-Hoon Cho, Seoul (KR); Kyung-Sook Jeon, Yongin-si (KR); Seung-Mi Seo, Seoul (KR); Jung-Suk Bang, Guri-si (KR); Mi-Seon Seo, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 262 days.

(21) Appl. No.: 12/898,095

(22) Filed: Oct. 5, 2010

(65) Prior Publication Data
US 2011/0090420 A1  Apr. 21, 2011

(30) Foreign Application Priority Data

Oct. 20, 2009  (KR) .................. 10-2009-0099810

(51) Int. Cl.
*G02F 1/1335* (2006.01)
*G02F 1/1333* (2006.01)
*H01L 21/00* (2006.01)

(52) U.S. Cl. ............. 349/12; 349/59; 438/50; 438/83
(58) Field of Classification Search .............. 349/12, 349/59; 438/50, 83
See application file for complete search history.

(56) References Cited

U.S. PATENT DOCUMENTS

| | | | | |
|---|---|---|---|---|
| 7,435,616 | B2 * | 10/2008 | Kim ............................. | 438/70 |
| 2012/0044444 | A1 * | 2/2012 | Park et al. .................... | 349/106 |
| 2012/0050654 | A1 * | 3/2012 | Kim et al. .................... | 349/116 |

FOREIGN PATENT DOCUMENTS

| | | |
|---|---|---|
| KR | 10-2002-0063498 | 8/2002 |
| KR | 10-2003-0057423 | 7/2003 |
| KR | 10-2004-0062015 | 7/2004 |
| KR | 10-2005-0001953 | 1/2005 |

* cited by examiner

*Primary Examiner* — Mike Qi
(74) *Attorney, Agent, or Firm* — H.C. Park & Associates, PLC (57) ABSTRACT

A sensor array substrate, a display device including the sensor array substrate, and a method of manufacturing the sensor array substrate are provided. The sensor array substrate includes a substrate, a first sensor formed on a first pixel area of the substrate and configured to detect light, an overcoat layer formed on the first sensor, and a shield layer formed over the overcoat layer, wherein the shield layer overlaps the first sensor.

23 Claims, 8 Drawing Sheets

SENSOR ARRAY SUBSTRATE, DISPLAY DEVICE INCLUDING THE SAME, AND METHOD OF MANUFACTURING THE SAME

CROSS REFERENCE TO RELATED APPLICATION

This application claims priority from and the benefit of Korean Patent Application No. 10-2009-0099810, filed on Oct. 20, 2009, which is hereby incorporated by reference for all purposes as if fully set forth herein.

BACKGROUND OF THE INVENTION

1. Field of the Invention

Exemplary embodiments of the present invention relate to a sensor array substrate, a display device including the sensor array substrate, and a method of manufacturing the sensor array substrate.

2. Discussion of the Background

A display device including a sensor array substrate may allow a user to enter data by touching the screen using a user's finger or another implement such as, for example, a stylus or a pen.

Touch panel devices including a sensor array substrate are generally classified as resistive film-type, capacitive-type, and optical sensor-type touch panel devices depending on the operating principle.

A resistive film-type touch panel device may be actuated by contact between electrodes due to application of pressure. A capacitive type touch panel device may operate by detecting changes in capacitances due to contact.

SUMMARY OF THE INVENTION

Exemplary embodiments of the present invention provide a technology designed to improve the image quality of a display device including a sensor array substrate while minimizing degradation of display quality due to signal noise.

Exemplary embodiments of the present invention also provide a sensor array substrate designed to minimize degradation of display quality due to signal noise.

Exemplary embodiments of the present invention also provide a display device including a sensor array substrate designed to minimize degradation of display quality due to signal noise.

Exemplary embodiments of the present invention also provide a method of manufacturing a sensor array substrate capable of minimizing degradation of display quality due to signal noise.

Additional features of the invention will be set forth in the description which follows, and in part will be apparent from the description, or may be learned by practice of the is invention.

An exemplary embodiment of the present invention discloses a sensor array substrate, including a substrate, a first sensor disposed on a first pixel area of the substrate, the first sensor being configured to detect light, an overcoat layer disposed on the first sensor, and a shield layer disposed over the overcoat layer, wherein the shield layer and the first sensor overlap.

An exemplary embodiment of the present invention also discloses a method of manufacturing a sensor array substrate, the method including forming a first sensor on a first pixel area of a substrate, forming an overcoat layer on the first sensor, and forming a shield layer on the overcoat layer, wherein the shield layer and the first sensor overlap.

An exemplary embodiment of the present invention also discloses a display device including a sensor array substrate including a base substrate, a sensor disposed on a unit pixel area of the base substrate, an overcoat layer disposed on the first sensor, and a shield layer disposed over the overcoat layer, wherein the sensor is configured to detect light, a display panel disposed opposite the sensor array substrate, the display panel including a plurality of pixel electrodes, and a liquid crystal layer disposed between the sensor array substrate and the display panel, wherein the shield layer and the sensor overlap.

It is to be understood that both the foregoing general description and the following detailed description are exemplary and explanatory and are intended to provide further explanation of the invention as claimed.

BRIEF DESCRIPTION OF THE ILLUSTRATED EMBODIMENTS

The accompanying drawings, which are included to provide a further is understanding of the invention and are incorporated in and constitute a part of this specification, illustrate exemplary embodiments of the invention, and together with the description serve to explain the principles of the invention.

DETAILED DESCRIPTION OF THE INVENTION

The invention is described more fully hereinafter with reference to the accompanying drawings, in which exemplary embodiments of the invention are shown. This invention may, however, be embodied in many different forms and should not be construed as limited to the embodiments set forth herein.

Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. As used herein, the term "and/or" includes any and all combinations of one or more of the associated listed items.

Spatially relative terms, such as "below," "beneath," "lower," "above," "upper," and the like, may be used herein for ease of description to describe the relationship of one is element or feature to another element(s) or feature(s) as illustrated in the figures. It will be understood that the spatially relative terms are intended to encompass different orientations of the device in use or operation in addition to the orientation depicted in the figures.

Exemplary embodiments of the present invention are described herein with reference to cross-section illustrations that are schematic illustrations of idealized exemplary embodiments (and intermediate structures) of the present invention. As such, variations from the shapes of the illustrations as a result, for example, of manufacturing techniques and/or tolerances, are to be expected. Thus, the present invention should not be construed as limited to the particular shapes of regions illustrated herein but are to include deviations in shapes that result, for example, from manufacturing.

Hereinafter, a sensor array substrate, a display device including the sensor array substrate, and a method of manufacturing the display device according to exemplary embodiments of the present invention will be described in detail with reference to the accompanying drawings.

Figure 1:
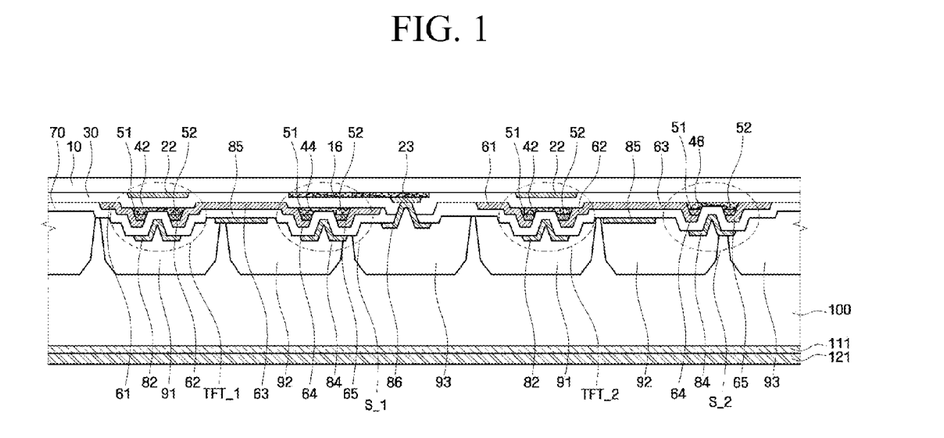
FIG. 1 is a cross-sectional view illustrating a sensor array substrate, according to an exemplary embodiment of the present invention.
Figure 2:
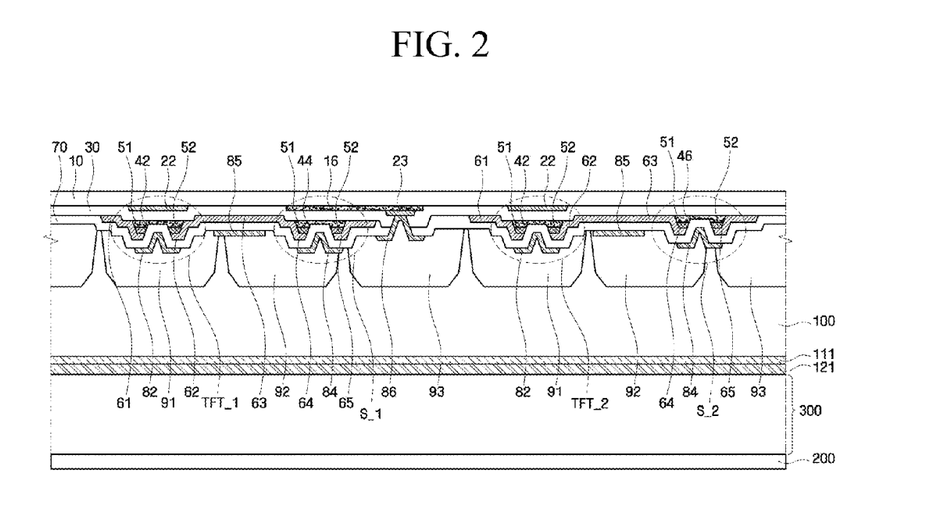
FIG. 2 is a cross-sectional view illustrating a display device including the sensor array substrate of FIG. 1 according to an exemplary embodiment of the present invention.
Figure 3:
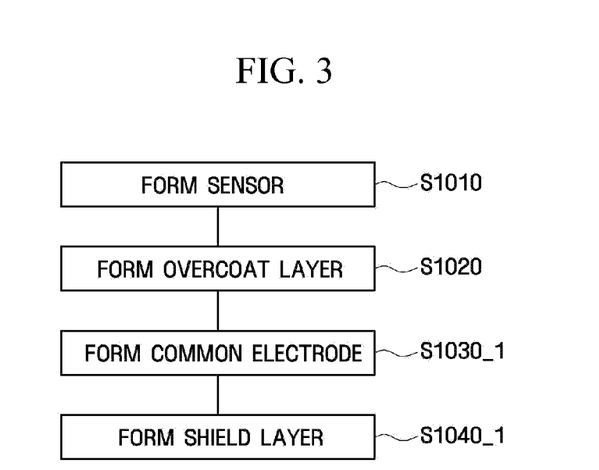
FIG. 3 is a flowchart illustrating a method of manufacturing the sensor array substrate of FIG. 1 according to an exemplary embodiment of the present invention.

FIG. 1 is a cross-sectional view illustrating a sensor array substrate according to an exemplary embodiment of the present invention. FIG. 2 is a cross-sectional view illustrating a display device including the sensor array substrate of FIG. 1 according to an exemplary embodiment of the present invention. FIG. 3 is a flowchart illustrating a method of manufacturing the sensor array substrate of FIG. 1 according to an exemplary embodiment of the present invention. FIG. 4, FIG. 5, FIG. 6, FIG. 7, FIG. 8, FIG. 9, and FIG. 10 are cross-sectional views illustrating processing steps of the method of manufacturing the sensor array substrate illustrated in FIG. 3.

Referring to FIG. 1, the sensor array substrate according to an exemplary is embodiment thereof includes a first sensor S_1, a second sensor S_2, a first thin-film transistor TFT_1, and a second thin-film transistor TFT_2, as well as other various elements formed on a substrate 10.

A light-blocking pattern 16 is formed on the substrate 10. The light-blocking pattern 16 prevents visible light from being incident on a first sensor semiconductor layer 44 of the first sensor S_1, while transmitting infrared light.

The first sensor semiconductor layer 44 of the first sensor S_1 detects the infrared light. The first sensor semiconductor layer 44 may be made of a low band-gap material. If visible light impinges on the first sensor semiconductor layer 44, the first sensor semiconductor layer 44 may detect the visible light and generate a signal, which may cause the first sensor S_1 to malfunction. Thus, the light-blocking pattern 16 may prevent malfunctions of the first sensor S_1 due to the visible light.

If visible light is incident on the light-blocking pattern 16, a signal may be generated on the light-blocking pattern 16 due to a photoelectromotive force effect. Thus, the light-blocking pattern 16 may prevent visible light from being incident on the first sensor semiconductor layer 44. The light-blocking pattern 16 may contain amorphous silicon (a-Si) or amorphous silicon germanium (a-SiGe) and may be made of a higher band-gap material than the first sensor semiconductor layer 44. The light-blocking pattern 16 may have an island configuration and may overlap the first sensor semiconductor layer 44 so as to block visible light from entering the first sensor semiconductor layer 44. The first sensor semiconductor layer 44 may also have a boundary located within a boundary of the light-blocking pattern 16.

A gate wire is formed on the substrate 10 and may transmit a gate signal. The gate wire may include a gate line (not shown) extending in a first direction, e.g., in a transverse is direction, and a gate electrode 22 for the first thin-film transistor TFT_1 and the second thin-film transistor TFT_2 projecting from the gate line.

A ground wire 23 is formed over the substrate 10. The ground wire 23 is electrically connected to the light-blocking pattern 16 and may discharge a voltage generated by the light-blocking pattern 16 that has absorbed visible light, thereby preventing the light-blocking pattern 16 from functioning as a gate electrode for the first sensor S_1. More specifically, if the light-blocking pattern 16 absorbs visible light, a voltage may be generated on the light-blocking pattern 16 due to a photoelectromotive force effect. In this case, the light-blocking pattern 16 may act as a gate electrode of the first sensor S_1, thereby causing the first sensor S_1 to malfunction. However, the presence of the ground wire 23 can prevent malfunction of the first sensor S_1 due to absorption of visible light in the light-blocking pattern 16. The ground wire 23 may extend in the first direction substantially parallel to the gate line, e.g., in the transverse direction of the substrate 10.

The gate wire and the ground wire 23 may be made of aluminum (Al) containing metal such as Al and Al alloy, silver (Ag) containing metal such as Ag and Ag alloy, copper (Cu) containing metal such as Cu and Cu alloy, molybdenum (Mo) containing metal such as Mo and Mo alloy, chromium (Cr), titanium (Ti), or tantalum (Ta). In addition, the gate wire and the ground wire 23 may have a multi-layered structure including two conductive films (not shown) having different physical characteristics. One of the two films may be made of a low resistivity metal including Al containing metal, Ag containing metal, and Cu containing metal for reducing signal delay or voltage drop in the gate wire and the ground wire 23. The other film may be made of a material such as a Mo containing metal, Cr, Ta or Ti, which have good physical, chemical, and electrical contact characteristics with other materials such as indium tin oxide (ITO) or is indium zinc oxide (IZO). Examples of combinations of the two films are a lower Cr film and an upper Al (alloy) film, and a lower Al (alloy) film and an upper Mo (alloy) film. However, the gate wire and the ground wire 23 are not limited to these examples and may be made of various metals or conductors.

A gate insulating layer 30 of silicon oxide (SiOx) or silicon nitride (SiNx) may be formed on the substrate 10, the gate wire, and the ground wire 23.

An island-shaped semiconductor layer 42 is formed on the gate insulating layer 30. The semiconductor layer 42 may be a semiconductor material such as hydrogenated a-Si (a-Si:H) or polycrystalline silicon (poly-Si), and may overlap the gate wire. Ohmic contact patterns 51 and 52 are formed on the semiconductor layer 42 using silicide or n+ a-Si:H heavily doped with n-type impurities.

In the first sensor S_1 the first sensor semiconductor layer 44 is formed, and in the second sensor S_2 a second sensor semiconductor layer 46 is formed. The first sensor semiconductor layer 44 and the second sensor semiconductor layer 46 are formed on the gate insulating layer 30 in order to detect light.

Each of the first sensor semiconductor layer 44 and the second sensor semiconductor layer 46 may have a single- or multi-layered structure including a-Si, a-SiGe, or micro crystalline Si (mc-Si).

More specifically, for example, where the first sensor S_1 is designed to detect infrared light, the first sensor semiconductor layer 44 may contain a-SiGe or mc-Si. Where the second sensor S_2 is designed to detect visible light, the second sensor semiconductor layer 46 may contain a-Si or a-SiGe. In this case, the first sensor semiconductor layer 44 may have a lower band gap than the second sensor semiconductor layer 46. Thus, the first sensor is semiconductor layer 44 may detect infrared light to generate a signal corresponding to the detected infrared light while the second sensor semiconductor layer 46 detects visible light to generate a signal corresponding to the detected visible light.

The ohmic contact patterns 51 and 52 are also formed on the first sensor semiconductor layer 44 and the second sensor semiconductor layer 46 using silicide or n+a-Si:H heavily doped with n-type impurities.

Data wires are disposed on the ohmic contact patterns 51 and 52. The data wires include data lines (not shown) extending in a second direction (e.g., in a longitudinal direction and intersecting the gate line to define a pixel), a source electrode 61 branched from the data lines and extending over the semiconductor layer 42, a drain electrode 62 separated from the source electrode 61 and disposed on the semiconductor layer 42 opposite to the source electrode 61 with respect to the gate electrode 22 or a channel region of the semiconductor layer 42, and a drain electrode extension 63 extending from the drain electrode 62 and connected to a sensor source electrode 64.

As shown in FIG. 1, the data wires are in direct contact with the underlying ohmic contact patterns 51 and 52 to form ohmic contacts. Since the ohmic contact patterns 51 and 52 perform ohmic contacts, the data wires may have a single layered structure made of a low-resistance material. For example, the data wires may be made of Cu, Al, Ti, or Ag.

However, in order to improve the contact resistance, the data wires may have a low-resistance single layered film of Ni, Co, Ti, Ag, Cu, Mo, Al, Be, Nb, Au, Fe, Se, or Ta. Alternatively, in order to improve the contact resistance, the data wires may have a multilayered structure. The multilayered structure may include a double-layered structure including, for example, Ta/Al, Ni/Al, Co/Al, Mo (or Mo alloy)/Cu, Ti (or Ti alloy)/Cu, TiN (or TiN alloy)/Cu, is Ta (or Ta alloy)/Cu, TiOx/Cu, Al/Nd, and Mo/Nb. The multilayered structure may alternatively include a triple-layered structure including, for example, Ti/Al/Ti, Ta/Al/Ta, Ti/Al/TiN, Ta/Al/TaN, Ni/Al/Ni, and Co/Al/Co.

Sensing wires are disposed on the gate insulating layer 30 in parallel with the data wires. The sensing wires include a sensing line (not shown) extending parallel to the data lines, the sensor source electrode 64 connected to the drain electrode 62 through the drain electrode extension 63 and extending over the first sensor semiconductor layer 44 and the second sensor semiconductor layer 46, and a sensor drain electrode 65 branched from the sensing line so as to extend over the first sensor semiconductor layer 44 and the second sensor semiconductor layer 46 and disposed opposite to the sensor source electrode 64.

The sensing wires are in direct contact with the ohmic contact patterns 51 and 52 to form ohmic contacts. The sensing wires may be made of the same material as the data wires and may have the same shape as the data wires; thus, repeated explanations are omitted.

A passivation layer 70 is formed on the semiconductor layer 42, the first sensor semiconductor layer 44, the second sensor semiconductor layer 46, the data wires, and the sensing wires. For example, the passivation layer 70 may be made of an inorganic insulator such as silicon nitride or silicon oxide, a photosensitive organic material having a good flatness characteristic, or a low dielectric insulating material such as a-Si:C:O and a-Si:O:F formed by plasma enhanced chemical vapor deposition (PECVD). The passivation layer 70 may have a double-layered structure including an upper organic layer having desired characteristics and a lower inorganic layer protecting the semiconductor layer 42, the first sensor semiconductor layer 44, and the second sensor semiconductor layer 46.

A sensor gate electrode 84 is located on the passivation layer 70 so as to overlap is the first sensor semiconductor layer 44 and the second sensor semiconductor layer 46. The sensor gate electrode 84 may supply a bias voltage to the first sensor S_1 and the second sensor S_2. The sensor gate electrode 84 may also prevent light from a backlight unit (not shown) from being incident on the first sensor semiconductor later 44 and the second sensor semiconductor layer 46. The sensor gate electrode 84 may be made of the same materials as the ground wire 23.

First light-blocking layer 82 is formed on the passivation layer 70 so as to overlap the semiconductor layer 42 of the first thin-film transistor TFT_1 and the second thin-film transistor TFT_2. Second light-blocking layer 85 is formed on the passivation layer 70 so as to overlap the drain electrode extension 63. The presence of the first light-blocking layer 82 and the second light-blocking layer 85 prevents light from the backlight unit from entering the semiconductor layer 42 and the drain electrode extension 63. Thereby, malfunctions of the first thin-film transistor TFT_1, the second thin-film transistor TFT_2, the first sensor S_1, and the second sensor S_2 may be prevented. The first light-blocking layer 82 and the second light-blocking layer 85 may be made of the same materials as the ground wire 23.

A ground connection wire 86 is disposed on the passivation layer 70 and connected to the ground wire 23 through a via hole formed in the passivation layer 70. The ground connection wire 86 discharges a signal produced in the light-blocking pattern 16 to the ground. The ground connection wire 86 may be made of the same materials as the ground wire 23.

As described above, each of the first thin-film transistor TFT_1 and the second thin-film transistor TFT_2 includes the gate electrode 22, the gate insulating layer 30, the semiconductor layer 42, the ohmic contact patterns 51 and 52, the source electrode 61, the drain electrode 62, the drain electrode extension 63 and the passivation layer 70, which have been is sequentially formed on the substrate 10. Each of the first thin-film transistor TFT_1 and the second thin-film transistor TFT_2 may further include the first light-blocking layer 82 and the second light-blocking layer 85.

Each of the first sensor S_1 and the second sensor S_2 includes the gate insulating layer 30, a corresponding first sensor semiconductor layer 44 or second sensor semiconductor layer 46, the sensor source electrode 64, the sensor drain electrode 65, the passivation layer 70, and the sensor gate electrode 84, that have been sequentially formed on the substrate 10. The first sensor S_1 may further include the light-blocking pattern 16, the ground wire 23, and the ground connection wire 86.

Color filter layers 91, 92, and 93 are disposed on the sensor gate electrode 84, the ground connection wire 86, the first light-blocking layer 82, and the second light-blocking layer 85. The color filter layers 91, 92, and 93 allow light passing through each subpixel area (not shown) to appear as a color. That is, the color filter layers 91, 92, and 93 determine the color of light passing through a subpixel area defined on a display panel 200 (shown in FIG. 2) that is disposed opposite the sensor array substrate and includes a plurality of pixel electrodes. Each subpixel area represents one of red (R), green (G), and blue (B).

Three subpixel areas constitute a unit pixel area. That is, an area in which the color filter layers 91, 92, and 93 are formed can be defined as a unit pixel area.

The first thin-film transistor TFT_1 and the first sensor S_1 are electrically connected to each other and are formed on a unit pixel area. A unit pixel area in which the first thin-film transistor TFT_1 and the first sensor S_1 are formed is referred to as a first pixel area. The second thin-film transistor TFT_2 and the second sensor S_2 are electrically connected to each other and formed on a second pixel area adjacent to the first pixel area.

If the color filter layers 91, 92, and 93 are formed on the display panel 200 (shown in FIG. 2), the sensor array substrate may not include the color filter layers 91, 92, and 93. In this case, a unit pixel area may be an area on a sensor array substrate that is directly opposite the color filter layers 91, 92, and 93 formed on the display panel 200.

An overcoat layer 100 is formed over the color filter layers 91, 92, and 93 and planarizes gaps created by the color filter layers 91, 92, and 93. The overcoat layer 100 may be formed of a material having a relative dielectric constant of 3.0 to 3.5 so as to reduce the parasite capacitance between a common electrode 111 and wires in the first sensor S_1 and the second sensor S_2. The overcoat layer 100 is typically made of an organic material having good planarization properties or inorganic material. In an exemplary embodiment, the overcoat layer 100 is made of a transparent organic material.

The common electrode 111 overlies the overcoat layer 100 and may apply a common voltage to a liquid crystal layer 300 (shown in FIG. 2). The common electrode 111 may include a transparent conductive material, such as ITO, IZO, or zinc oxide (ZnO).

A shield layer 121 is formed over the common electrode 111 and overlaps the first thin film transistor TFT_1, the second thin-film transistor TFT_2, the first sensor S_1, and the second sensor S_2. The shield layer 121 also overlaps the gate wire, the data wires, and the sensing wires.

The shield layer 121 may prevent noise from affecting to the first thin-film transistor TFT_1, the second thin-film transistor TFT_2, the first sensor S_1, and/or the second sensor S_2. More specifically, to drive a switching element (not shown) formed on the display panel 200 and connected to each of the plurality of pixel electrodes, a signal may be applied to the switching element. Upon application of the signal, electromagnetic waves may be produced and may distort a common voltage applied by the common electrode 111. Due to the distortion, noise may affect to the first sensor S_1 and the second sensor S_2, thereby resulting in malfunction of the first sensor S_1 and the second sensor S_2. The noise may also degrade the display quality of a display device and the long-term reliability of the first sensor S_1 and the second sensor S_2.

The shield layer 121 may also provide an electrical path that may serve to discharge generated electromagnetic waves. To accomplish this function, the shield layer 121 may be made of a conductive material. That is, the shield layer 121 may not be electrically floating but may be connected to an external ground electrode so that it can transmit the generated electromagnetic waves to a ground electrode in order to eliminate the electromagnetic waves. In this way, the shield layer 121 can prevent the application of noise to the first thin-film transistor TFT_1, the second thin-film transistor TFT_2, the first sensor S_1, and/or the second sensor S_2.

The shield layer 121 may be made of a material having a lower resistance than the common electrode 111 and may make an electrical contact with the common electrode 111. Thus, a voltage drop due to the resistance of the common electrode 111 can be prevented.

Further, the shield layer 121 may prevent light from a backlight unit from being incident on the first sensor S_1 and the second sensor S_2. To accomplish this function, the shield layer 121 may have an optical density greater than 4. To achieve an optical density greater than 4, the shield layer 121 may be formed to a thickness of greater than or equal to 500 Å. The shield layer 121 may be made of a conductive metal. The shield layer 121 may include, for example, at least one selected from the group consisting of Al, Cr, Mo, Cu, Ni, W, Ta and Ti, and combinations thereof.

A display device according to an exemplary embodiment of the present invention is described with reference to FIG. 2. Referring to FIG. 2, the display device according to the current embodiment thereof includes a sensor array substrate, a display panel 200, and a liquid crystal layer 300. For convenience of explanation, elements having the same functions as those in FIG. 1 are denoted by the same reference numerals and a detailed explanation of such elements is omitted.

A sensor array substrate includes a substrate 10, a first sensor S_1, a second sensor S_2, an overcoat layer 100 formed over the first sensor S_1 and the second sensor S_2, and a shield layer 121 formed over the overcoat layer 100. The first sensor S_1 and the second sensor S_2 may be formed on one of a plurality of unit pixel areas defined on the substrate 10 and may be configured to detect light. The sensor array substrate further includes a common electrode 111 disposed between the overcoat layer 100 and the shield layer 121.

The display panel 200 is disposed opposite the sensor array substrate and has a plurality of pixel electrodes (not shown) formed thereon. Each of the plurality of pixel electrodes is connected to a switching element. Each switching element may adjust a voltage being applied to a corresponding pixel electrode. The amount of light transmitted can be adjusted by driving liquid crystals in the liquid crystal layer 300 by applying voltages across the pixel electrodes and the common electrode 111.

The liquid crystal layer 300 is sandwiched between the sensor array substrate and the display panel 200. The transmissivity of light is adjusted by a voltage difference between the pixel electrode and the common electrode.

Figure 4:
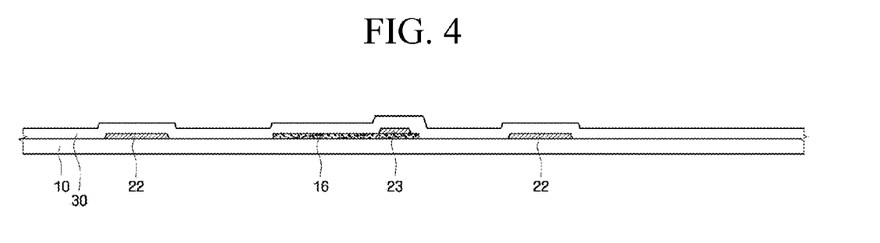
FIG. 4, FIG. 5, FIG. 6, FIG. 7, FIG. 8, FIG. 9, and FIG. 10 are cross-sectional views illustrating processing steps of the method of manufacturing the sensor array substrate illustrated in FIG. 3.

A method of manufacturing the sensor array substrate of FIG. 1 according to an exemplary embodiment of the present invention is described with reference to FIG. 3, FIG. 4, is FIG. 5, FIG. 6, FIG. 7, FIG. 8, FIG. 9, and FIG. 10.

First, referring to FIG. 3 and FIG. 4, in order to form the light-blocking pattern 16 on the substrate 10, an a-Si layer is formed by depositing a-Si over the substrate 10 using Plasma Enhanced Chemical Vapor Deposition (PECVD). The a-Si layer is subsequently patterned to form the light-blocking pattern 16. In this case, the light-blocking pattern 16 may be formed on an area in which the first sensor S_1 will be formed.

Next, a conductive layer for a gate wire and a ground wire is formed and patterned to form the gate line (not shown), the gate electrode 22, and the ground wire 23. The gate electrode 22 is formed on an area in which the first thin-film transistor TFT_1 and the second thin-film transistor TFT_2 will be formed. The ground wire 23 is in contact with the light-blocking pattern 16.

The gate insulating layer 30 is deposited over the substrate 10, the gate wire, and the ground wire 23 using PECVD or reactive sputtering. The gate insulating layer 30 may be formed of silicon nitride (SiNx), silicon oxide (SiOx), silicon oxynitride (SiON), or silicon oxycarbide (SiOC).

Figure 5:
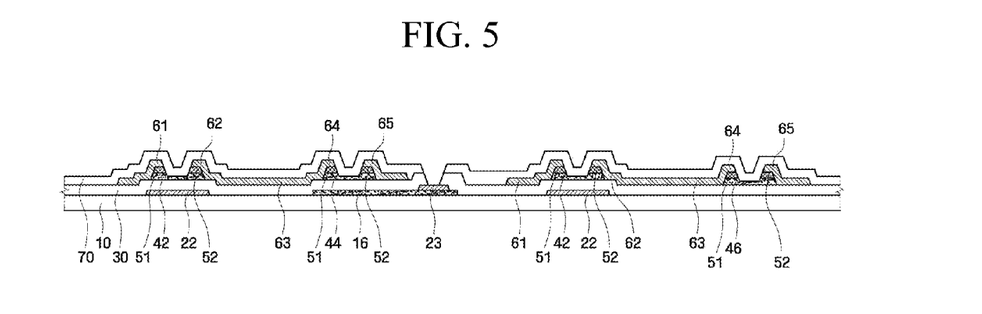

Referring to FIG. 5, the semiconductor layer 42 is formed on the gate insulating layer 30 so as to overlap the gate electrode 22. The first sensor semiconductor layer 44 may be formed of a-SiGe above the light-blocking pattern 16 so as to overlap the light-blocking pattern 16. The second sensor semiconductor layer 46 may be formed of a-Si on the gate insulating layer 30.

The ohmic contact patterns 51 and 52 are formed on the semiconductor layer 42, the first sensor semiconductor layer 44, and the second sensor semiconductor layer 46.

A conductive layer for data wires and sensing wires is deposited on the ohmic is contact patterns 51 and 52 and is patterned to form the data wires including the data lines (not shown), the source electrode 61, the drain electrode 62, and the drain electrode extension 63 extending from the drain electrode 62 and connected to the sensor source electrode 64, as well as the sensing wires including the sensor source electrode 64 and the sensor drain electrode 65.

Following the formation of the data wires and the sensing wires, the passivation layer 70 is formed on the semiconductor layer 42, the first sensor semiconductor layer 44, the second sensor semiconductor layer 46, the data wires, and the sensing wires, by depositing SiNx or SiOx using PECVD.

The gate insulating layer 30 and the passivation layer 70 are patterned to form a via hole exposing a portion of a top surface of the ground wire 23.

Figure 6:
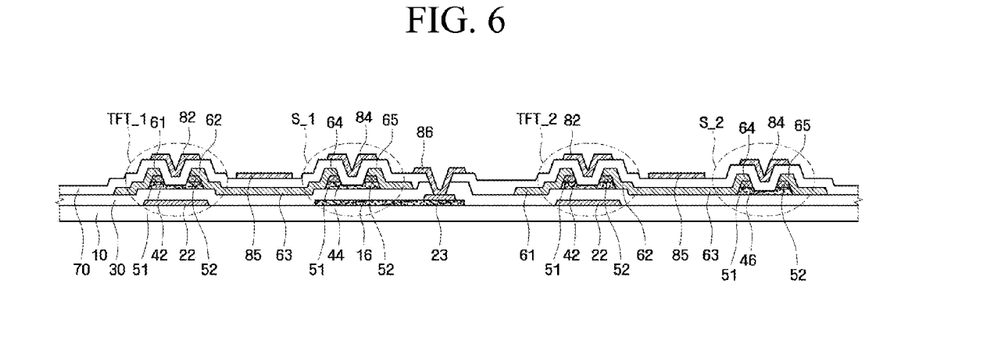

Referring to FIG. 6, a conductive layer for a sensor gate electrode 84, a first light-blocking layer 82, a second light-blocking layer 85, and a ground connection wire 86 are deposited by, for example, sputtering, and are patterned to form the sensor gate electrode 84, the first light-blocking layer 82, the second light-blocking layer 85, and the ground connection wire 86.

By performing the above process described with reference to FIG. 4, FIG. 5, and FIG. 6, the first thin-film transistor TFT_1, the second thin-film transistor TFT_2, the first sensor S_1, and the second sensor S_2 are formed (S1010 in FIG. 3).

Figure 7:
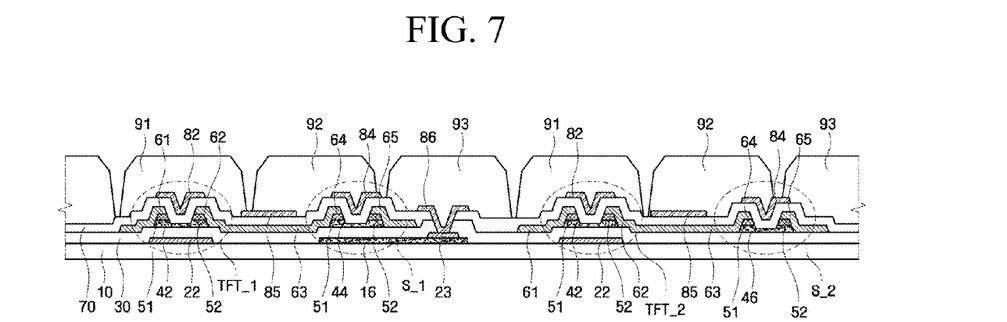

Referring to FIG. 7, the color filter layers 91, 92, and 93 are formed on the passivation layer 70, the sensor gate electrode 84, the ground connection wire 86, the first light-blocking layer 82, and the second light-blocking layer 85 by one of a printing technique using a color filter material and an ink-jet printing apparatus, a gravure printing technique, a screen printing technique, and photolithography.

Figure 8:
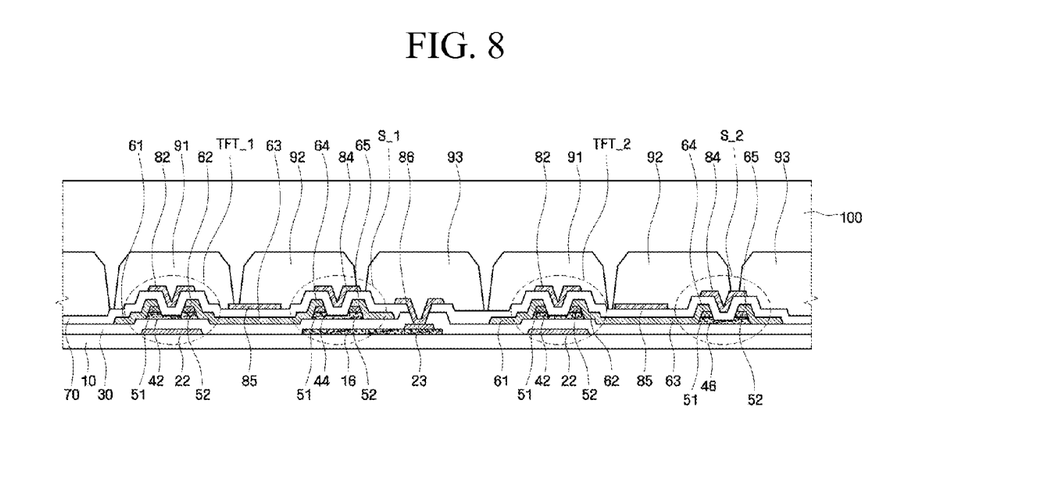

Referring to FIG. 8, the overcoat layer 100 is formed on the color filter layers 91, 92, and 93 by depositing an organic layer using PECVD (S1020 in FIG. 3).

Figure 9:
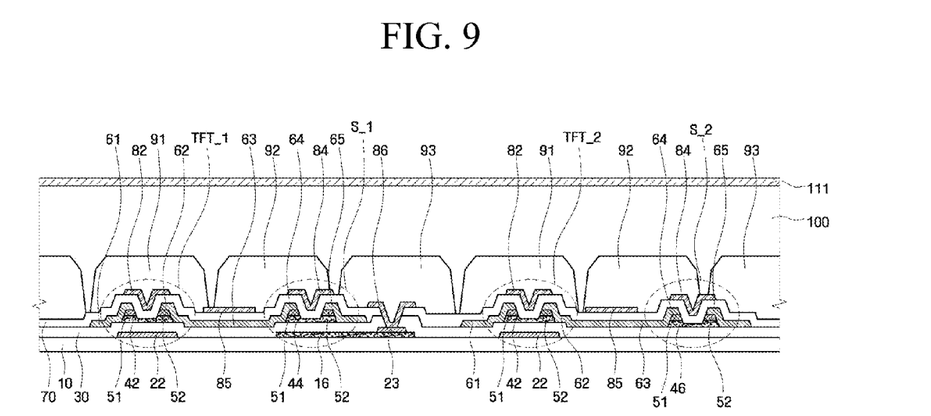

Referring to FIG. 9, the common electrode 111 is formed on the overcoat layer 100 by sputter depositing indium tin oxide (ITO) or indium zinc oxide (IZO) (S1030_1 in FIG. 3).

Figure 10:
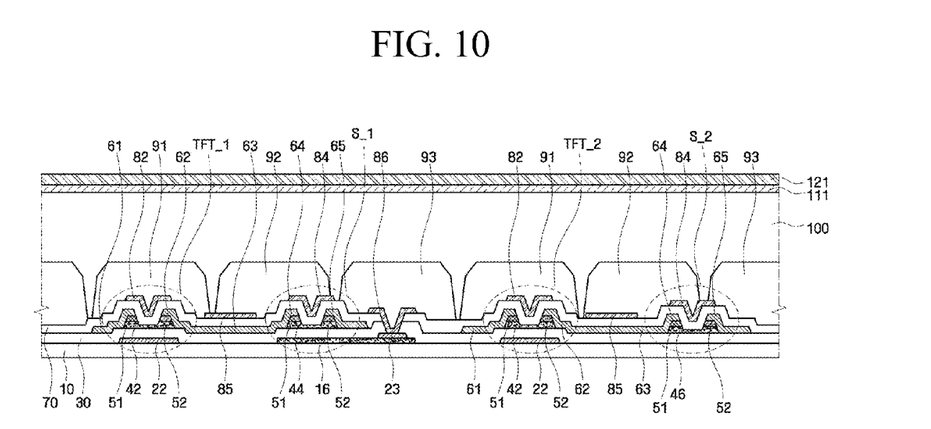

Referring to FIG. 10, the shield layer 121 is formed by sputtering a metal on the common electrode 111 (S1040_1 in FIG. 3).

By performing the above processing steps, the sensor array substrate according to an exemplary embodiment may be manufactured.

A sensor array substrate according to an exemplary embodiment of the present invention, a display device including the sensor array substrate according to an exemplary embodiment, and a method of manufacturing the sensor array substrate according to an exemplary embodiment are described in detail with reference to FIG. 11, FIG. 12, FIG. 13, and FIG. 14.

Figure 11:
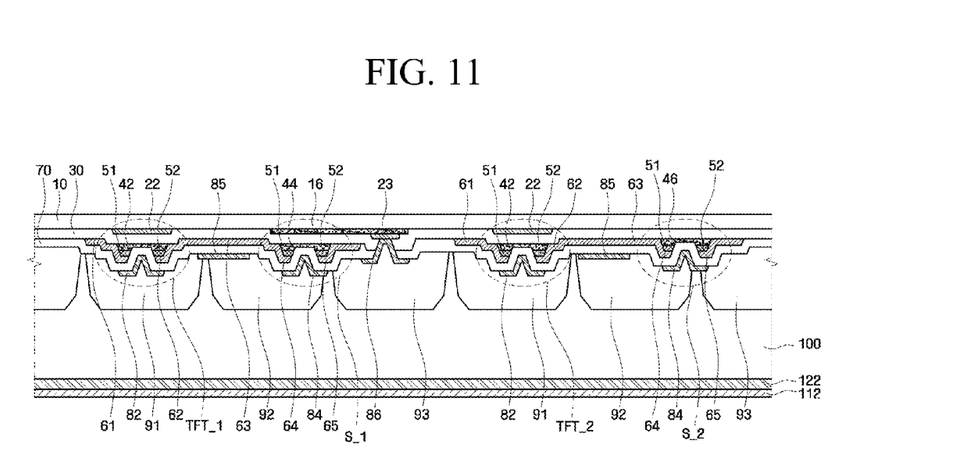
FIG. 11 is a cross-sectional view illustrating a sensor array substrate according to an exemplary embodiment of the present invention.
Figure 12:
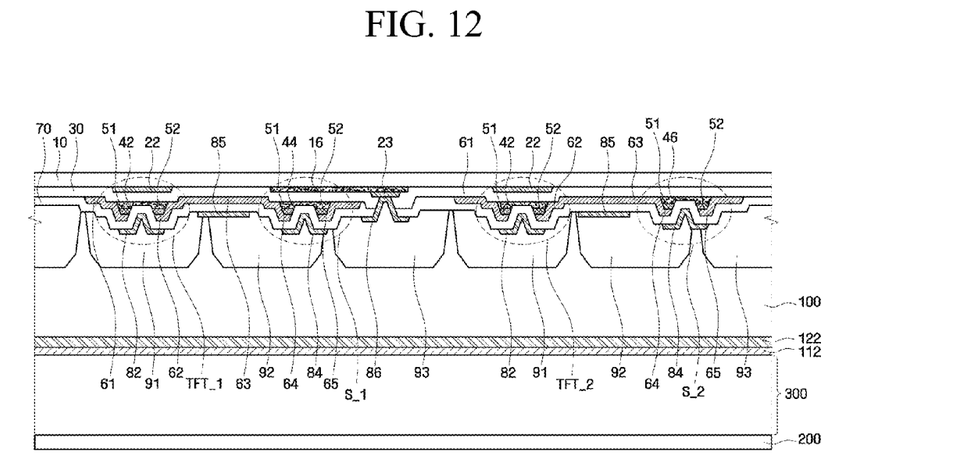
FIG. 12 is a cross-sectional view illustrating a display device including the sensor array substrate of FIG. 11 according to an exemplary embodiment of the present invention.
Figure 13:
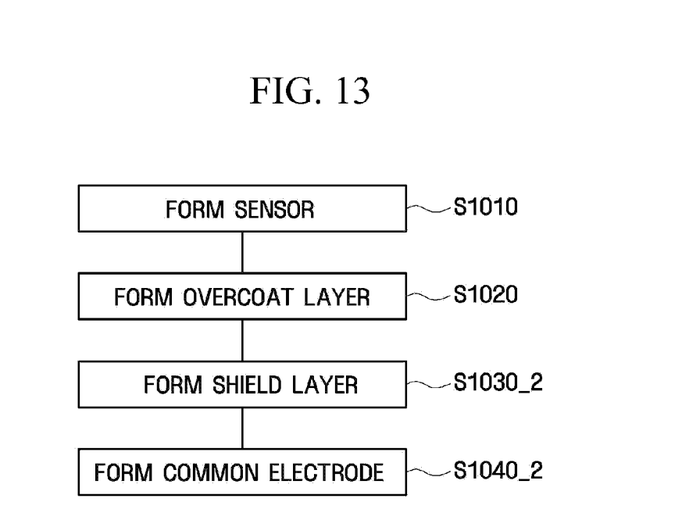
FIG. 13 is a flowchart illustrating a method of manufacturing the sensor array substrate of FIG. 11 according to an exemplary embodiment of the present invention.
Figure 14:
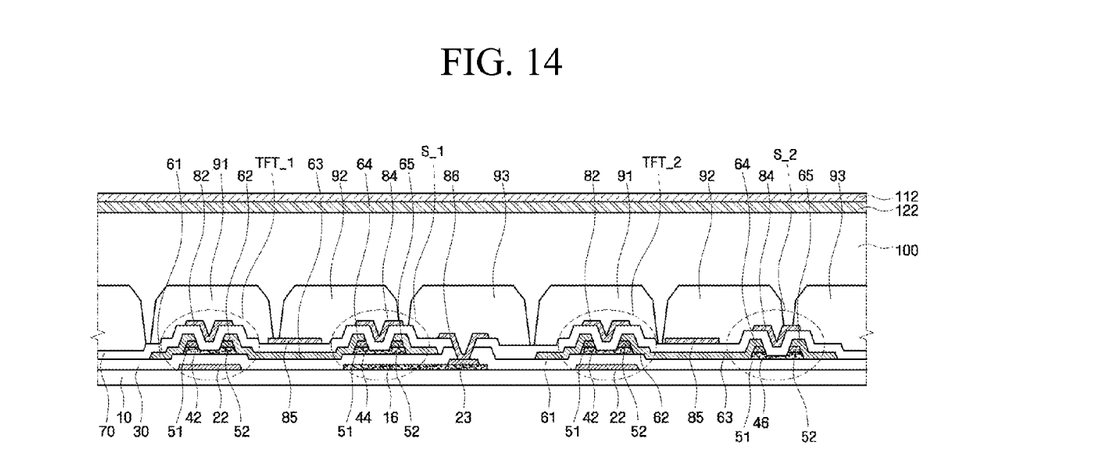
FIG. 14 is a cross-sectional view illustrating processing steps of the method of manufacturing the sensor array substrate illustrated in FIG. 13.

FIG. 11 is a cross-sectional view illustrating a sensor array substrate according to an exemplary embodiment of the present invention. FIG. 12 is a cross-sectional view illustrating a display device including the sensor array substrate of FIG. 11 according to an exemplary embodiment. FIG. 13 is a flowchart illustrating a method of manufacturing the sensor array substrate of FIG. 11 according to an exemplary embodiment. FIG. 14 is a cross-sectional view illustrating processing steps of the method of manufacturing the sensor array substrate illustrated in FIG. 13. For convenience of explanation, elements having the same functions as those in FIG. 1 are denoted by the same reference numerals and a detailed explanation of such elements is omitted.

The sensor array substrate, the display device, and the method of manufacturing the sensor array substrate according to an exemplary embodiment of the present invention have basically the same features as those of previous exemplary embodiments except for the following features.

Referring to FIG. 11, a shield layer 122 is interposed between an overcoat layer 100 and a common electrode 112.

Referring to FIG. 12, the display device according to an exemplary embodiment includes the sensor array substrate with the shield layer 122 interposed between the overcoat layer 100 and the common electrode 112.

Referring to FIG. 13 and FIG. 14, the shield layer 122 is formed by sputtering a metal on the overcoat layer 100 (S1030_2). The common electrode 112 is formed on the shield layer 122 by sputter depositing ITO or IZO (S1040_2). By performing the above processing steps, the sensor array substrate according to an exemplary embodiment may be manufactured.

A sensor array substrate according to an exemplary embodiment of the present invention, a display device including the sensor array substrate according to an exemplary embodiment, and a method of manufacturing the sensor array substrate according to an exemplary embodiment are described in detail with reference to FIG. 15, FIG. 16, FIG. 17, and FIG. 18.

Figure 15:
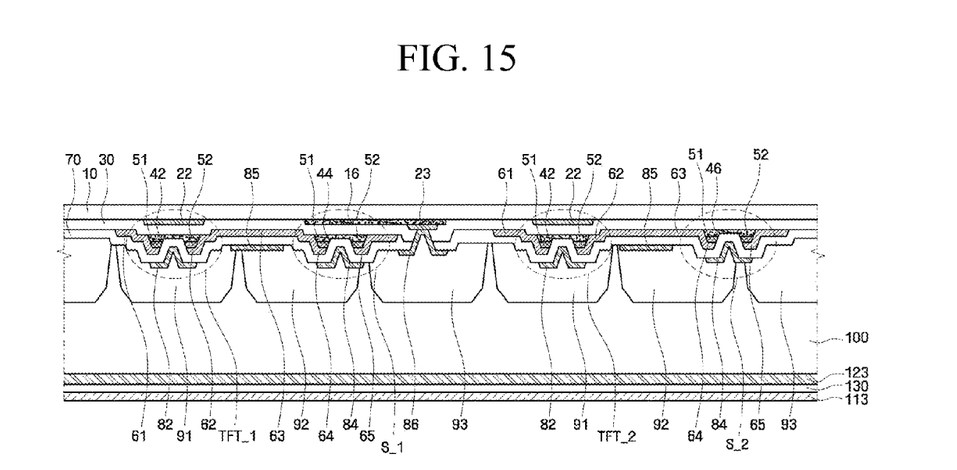
FIG. 15 is a cross-sectional view illustrating a sensor array substrate according to an exemplary embodiment of the present invention.
Figure 16:
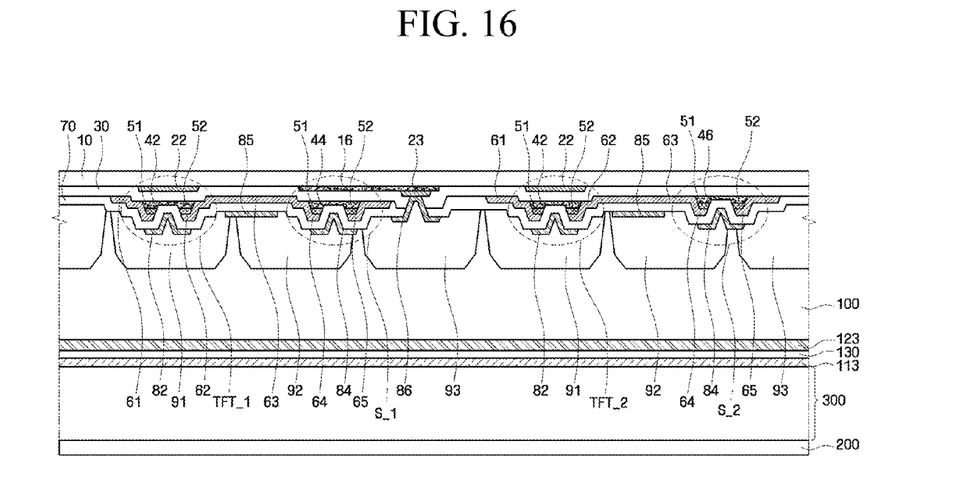
FIG. 16 is a cross-sectional view illustrating a display device including the sensor is array substrate of FIG. 15 according to an exemplary embodiment of the present invention.
Figure 17:
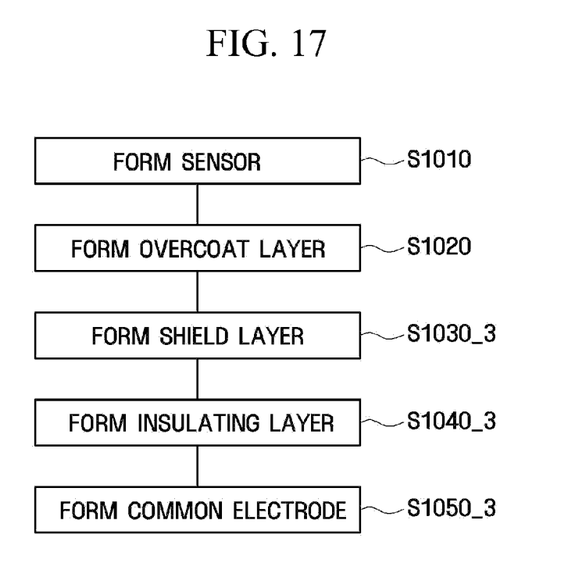
FIG. 17 is a flowchart illustrating a method of manufacturing the sensor array substrate of FIG. 15 according to an exemplary embodiment of the present invention.
Figure 18:
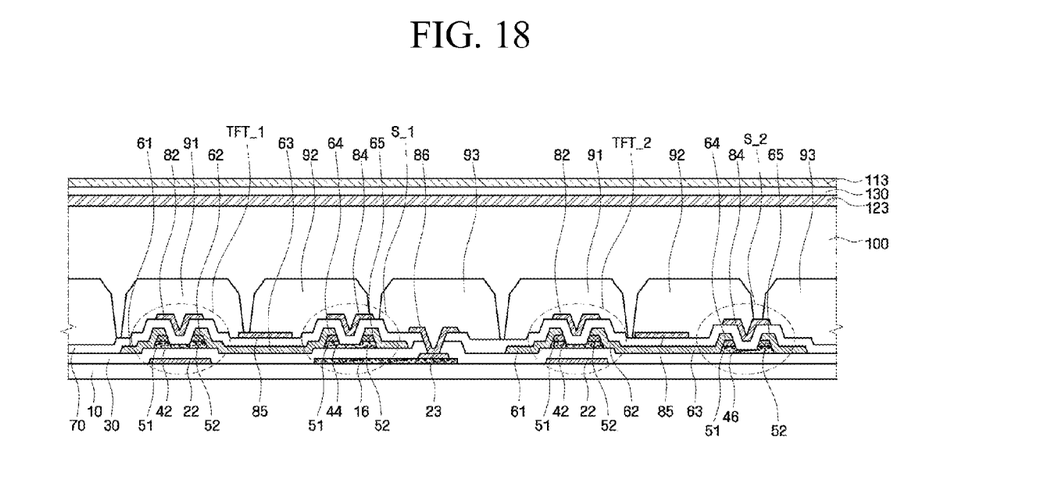
FIG. 18 is a cross-sectional view illustrating processing steps of the method of manufacturing the sensor array substrate illustrated in FIG. 17 according to an exemplary embodiment of the present invention.

FIG. 15 is a cross-sectional view illustrating a sensor array substrate according to an exemplary embodiment of the present invention. FIG. 16 is a cross-sectional view illustrating a display device including the sensor array substrate of FIG. 15 according to an exemplary embodiment of the present invention. FIG. 17 is a flowchart illustrating a method of manufacturing the sensor array substrate of FIG. 15 according to an exemplary embodiment of is the present invention. FIG. 18 is a cross-sectional view illustrating processing steps of the method of manufacturing the sensor array substrate illustrated in FIG. 17. For convenience of explanation, elements having the same functions as those in FIG. 1 are denoted by the same reference numerals and a detailed explanation of such elements is omitted.

The sensor array substrate, the display device, and the method of manufacturing the sensor array substrate according to an exemplary embodiment have basically the same features as those of the exemplary embodiments shown in FIG. 11, FIG. 12, FIG. 13, and FIG. 14, except for the following features.

Referring to FIG. 15 and FIG. 16, a shield layer 123 is formed over an overcoat layer 100. An insulating layer 130 and a common electrode 113 are formed on the shield layer 123. That is, the insulating layer 130 is interposed between the shield layer 123 and the common electrode 113. Although not shown in FIG. 15 or FIG. 16, the insulating layer 130 has a via hole through which the shield layer 123 is electrically connected to the common electrode 113.

Referring to FIG. 17 and FIG. 18, the shield layer 123 is formed by sputtering metal on the overcoat layer 100 (S1030_3). The insulating layer 130 is formed over the shield layer 123 by depositing an organic or inorganic layer using PECVD (S1040_3).

To achieve an electrical connection between the common electrode 113 and the shield layer 123, the via hole is then formed in the insulating layer 130 to expose the shield layer 123.

Subsequently, the common electrode 113 is formed on the overcoat layer 100 by depositing ITO or IZO on the insulating layer 130 and the exposed shield layer 123 using sputtering (S1050_3). By performing the above processing steps, the sensor array substrate may be manufactured.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A sensor array substrate, comprising:
   a substrate;
   a first sensor disposed on a first pixel area of the substrate, the first sensor being configured to detect light;
   an overcoat layer disposed on the first sensor; and
   a shield layer disposed over the overcoat layer,
   wherein the shield layer and the first sensor overlap.

2. The substrate of claim 1, further comprising a common electrode disposed on the overcoat layer, wherein the shield layer is disposed on the common electrode.

3. The substrate of claim 1, further comprising a common electrode disposed on the shield layer.

4. The substrate of claim 3, further comprising an insulating layer disposed between the shield layer and the common electrode.

5. The substrate of claim 1, further comprising color filter layers disposed between the first sensor and the overcoat layer.

6. The substrate of claim 1, wherein the first sensor comprises:
   a light-blocking pattern disposed on the substrate;
   a gate insulating layer disposed on the light-blocking pattern; and
   a sensor semiconductor layer disposed on the gate insulating layer,
   wherein the light-blocking pattern and the sensor semiconductor layer overlap.

7. The substrate of claim 1, further comprising a second sensor disposed on a second pixel area adjacent to the first pixel area, the second sensor being configured to detect light, wherein the overcoat layer is further disposed on the second sensor, and wherein the shield layer and the second sensor overlap.

8. The substrate of claim 7, wherein the first sensor is configured to detect infrared light and the second sensor is configured to detect visible light.

9. The substrate of claim 7, wherein the shield layer comprises at least one element selected from the group consisting of aluminum (Al), chrome (Cr), molybdenum (Mo), copper (Cu), nickel (Ni), tungsten (W), tantalum (Ta), and titanium (Ti).

10. The substrate of claim 9, wherein the shield layer has a thickness of at least 500 Å.

11. A method of manufacturing a sensor array substrate, the method comprising:
    forming a first sensor on a first pixel area of a substrate;
    forming an overcoat layer on the first sensor; and
    forming a shield layer on the overcoat layer,
    wherein the shield layer and the first sensor overlap.

12. The method of claim 11, further comprising forming a common electrode on the overcoat layer, wherein the shield layer is formed on the common electrode.

13. The method of claim 11, further comprising forming a common electrode on the shield layer.

14. The method of claim 13, further comprising forming an insulating layer on the shield layer, wherein the common electrode is formed on the insulating layer.

15. The method of claim 11, further comprising forming color filter layers on the first sensor.

16. The method of claim 11, wherein forming the first sensor comprises:
    forming a light-blocking pattern on the substrate;
    forming a gate insulating layer on the light-blocking pattern; and
    forming a sensor semiconductor layer on the gate insulating layer,
    wherein the light-blocking pattern and the sensor semiconductor layer are formed to overlap.

17. The method of claim 11, further comprising forming a second sensor on a second pixel area adjacent to the first pixel area, the second sensor being configured to detect light, wherein the forming of the overcoat layer comprises forming the overcoat layer on the second sensor, and wherein the shield layer and the second sensor overlap.

18. The method of claim 17, wherein the shield layer comprises at least one element selected from the group consisting of aluminum (Al), chrome (Cr), molybdenum (Mo), copper (Cu), nickel (Ni), tungsten (W), tantalum (Ta), and titanium (Ti).

19. The method of claim 18, wherein the shield layer is formed to a thickness of at least 500 Å.

20. A display device, comprising:
    a sensor array substrate comprising a base substrate, a sensor disposed on a unit pixel area of the base substrate, an overcoat layer disposed on the sensor, and a shield layer disposed over the overcoat layer, wherein the sensor is configured to detect light;
    a display panel disposed opposite the sensor array substrate, the display panel comprising a plurality of pixel electrodes; and
    a liquid crystal layer disposed between the sensor array substrate and the display panel,
    wherein the shield layer and the sensor overlap.

21. The display device of claim 20, wherein the sensor array substrate further comprises a common electrode disposed on the overcoat layer, and wherein the shield layer is disposed on the common electrode.

22. The display device of claim 20, wherein the sensor array substrate further comprises a common electrode disposed on the overcoat layer, and wherein the shield layer is disposed between the common electrode and the overcoat layer.

23. The display device of claim 22, wherein the sensor array substrate further comprises an insulating layer disposed between the shield layer and the common electrode.

* * * * *